United States Patent
Kueppers

(10) Patent No.: US 9,067,570 B2
(45) Date of Patent: Jun. 30, 2015

(54) APPARATUS FOR CLEANING WHEELCHAIR TIRE

(71) Applicant: Jeffrey Kueppers, Rochester, NY (US)

(72) Inventor: Jeffrey Kueppers, Rochester, NY (US)

(*) Notice: Subject to any disclaimer, the term of this patent is extended or adjusted under 35 U.S.C. 154(b) by 0 days.

(21) Appl. No.: 14/222,537

(22) Filed: Mar. 21, 2014

(65) Prior Publication Data

US 2014/0284911 A1     Sep. 25, 2014

Related U.S. Application Data

(60) Provisional application No. 61/803,903, filed on Mar. 21, 2013, provisional application No. 61/861,104, filed on Aug. 1, 2013.

(51) Int. Cl.
*B60S 1/68* (2006.01)
*A61G 5/10* (2006.01)

(52) U.S. Cl.
CPC ... *B60S 1/68* (2013.01); *B60S 1/685* (2013.01)

(58) Field of Classification Search
CPC ............ B60S 1/68; A61G 5/10; Y10S 297/04
USPC ........................ 280/855, 158.1, 856; 15/256.5
See application file for complete search history.

(56) References Cited

U.S. PATENT DOCUMENTS

| | | | | |
|---|---|---|---|---|
| 940,859 | A | * 11/1909 | Davidson | 280/855 |
| 2,960,337 | A | * 11/1960 | Johnson | 473/94 |
| 4,605,239 | A | 8/1986 | Warfel | |
| 5,857,238 | A | 1/1999 | Jmill | |

FOREIGN PATENT DOCUMENTS

| | | |
|---|---|---|
| DE | 20306522 | 8/2003 |
| NL | 1019720 | 1/2002 |

* cited by examiner

*Primary Examiner* — J. Allen Shriver, II
*Assistant Examiner* — Bryan Evans
(74) *Attorney, Agent, or Firm* — Tracy Jong Law Firm; Tracy P. Jong; Cheng Ning Jong

(57) ABSTRACT

The cleaning apparatus is essentially an adjustable bar having an adapter on one end and a cleaner head on the opposing end. The adjustable bar includes a main cylinder head pivotably attached at a first pivot to the adapter, the main cylinder head having an opening configured to receive a main cylinder rod slideable within the main cylinder head's opening and can be locked in place using a lock to form a suitable length. The free end of the main cylinder rod is pivotably connected to a bracket at a second pivot. The cleaner head is in turn connected to the bracket at a third pivot. The cleaner head includes a cleaner housing configured to slidingly cooperate with a complementary cleaner housing such that the width of the cleaner head is adjustable to accommodate wheelchair tires of different sizes.

15 Claims, 11 Drawing Sheets

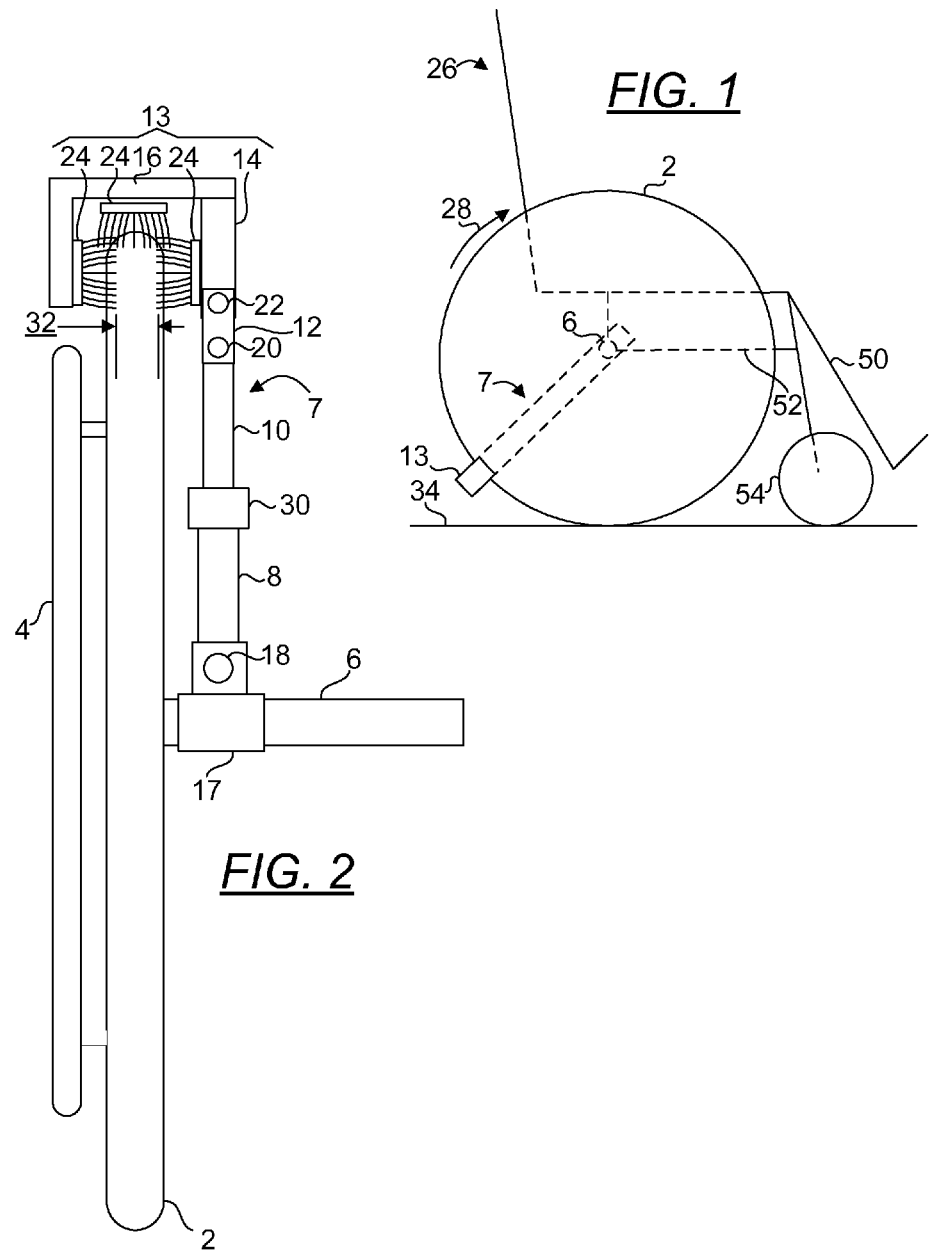

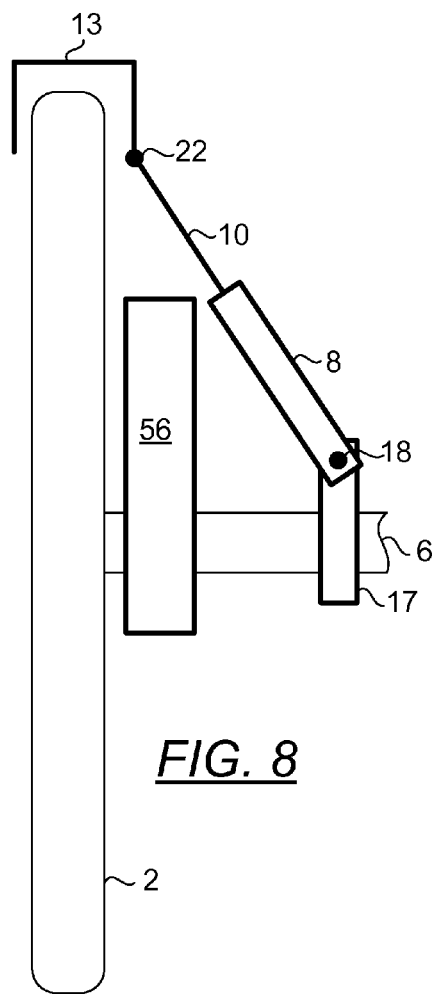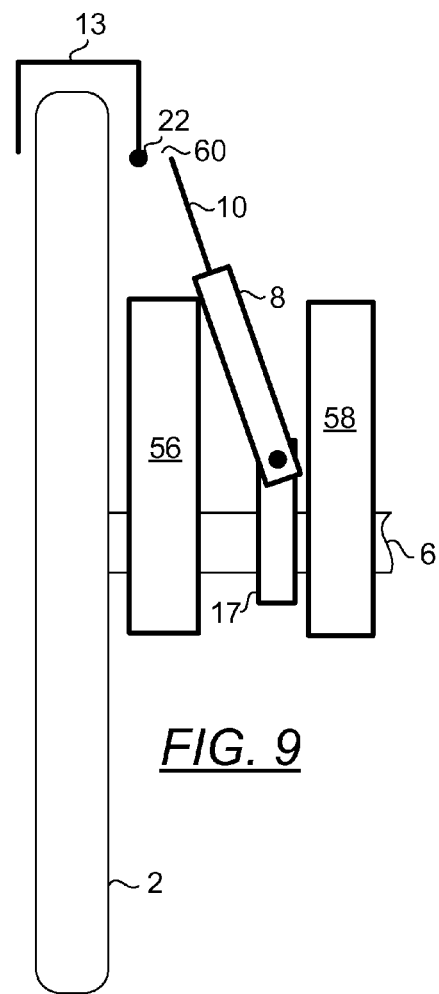

APPARATUS FOR CLEANING WHEELCHAIR TIRE

PRIORITY CLAIM AND RELATED APPLICATIONS

This non-provisional application claims the benefit of priority from provisional application U.S. Ser. No. 61/803,903 filed on Mar. 21, 2013 and provisional application U.S. Ser. No. 61/861,104 filed on Aug. 1, 2013. Each of said applications is incorporated by reference in its entirety.

BACKGROUND OF THE INVENTION

1. The Field of the Invention

The present invention is directed generally to an apparatus for cleaning a wheelchair wheel and/or tire. The present invention is directed more specifically to a universal and adjustable apparatus suitable for cleaning a wheelchair wheel and/or tire during use.

2. Background Art

Although most to all manually powered wheelchairs are equipped with hand rims to provide hand grips such that their wheels can be manually rotated to provide mobility to their users, experienced wheelchair users tend to gravitate towards engaging the wheels directly as the combination of hand rims and tires provides a larger total surface area for grasps. It is imperative then that the wheels be sufficiently clean such that the users' hands can be kept relatively clean. In many cases, the wheels are disposed relatively close to the users' legs or their pants. Dirty wheels or tires cause the users' legs or pants to be soiled easily.

As wheelchairs come in diverse designs, it would not have been obvious to provide a cleaning apparatus that can be adapted to a variety of designs and structures without some level of customization. Applicant discovered that there are two major types of wheelchairs, i.e., one with an axle connecting the two push wheels of the wheelchair and another without an axle, but that is often "foldable" or "collapsible." The latter type is however constructed from a frame having at least one bar in the vicinity of a wheel that is orientated in a direction parallel to the normal direction of travel of the wheelchair (or at a right angle to the axis of rotation of the push wheels of the wheelchair).

Several cleaning apparatuses have been devised to clean wheelchair wheels. However, these apparatuses are only suitable and configured to be mounted on specific types of wheelchairs. U.S. Pat. No. 4,605,239 to Warfel (hereinafter Warfel) discloses a tire and wheel cleaner for cleaning the wheels of wheelchairs. A mounting bracket is attached to the frame of the wheelchair and holds a support arm in one of several user-selected positions. In one such position, a curved brush attached to the support arm is placed into contact with the large wheel of the wheelchair such that the wheel is cleaned as the wheelchair moves along. This disclosure shows a cleaner which can be mounted with minimal hardware to a wheelchair. The mounting location of the cleaner, however, is less than ideal as the debris dislodged by the cleaner may be reacquired or fail to fall off from the cleaner.

U.S. Pat. No. 5,857,238 to Jmill (hereinafter Jmill) discloses a cleaning device assembly for vehicle tires, including a disposable cleaning cartridge, a shell, a connecting arm, and means for securing the connecting arm to a vehicle. The cleaning cartridge fits snugly over a vehicle tire, and is adjustable to accommodate tires of various widths. The cartridge includes a bristle brush or sponge liner for removing debris from a tire, and is secured to the shell with an adhesive or other means. The shell is adjustable relative to the connecting arm, which is further adjustable relative to the vehicle on which the cleaning device is mounted. This disclosure shows a cleaning device using one or two adjustable arms to secure a cleaning head (shell with cleaning cartridge). As ball/socket joints are used in such device, such device is not sufficiently sturdy if it is adopted to be used on a wheelchair even with lockable ball/socket joints.

German Pat. No. 20306522 to Veltinger (hereinafter Veltinger) discloses a tire cleaning device for wheelchairs, each cleaning device comprising a bristle area attached to a clamping element. This disclosure shows the use of a conveniently located brush. However, the device may not be adapted to wheelchairs with frames not suitable for the clamping element. Further, the bristle area is not sufficiently adjustable to conform to tires of various shapes and sizes.

Dutch Pat. No. 1019720 to Schaaper et al. (hereinafter Schaaper) discloses a machine for cleaning tires of wheelchair that is attached to a chair frame and has rotating brush driven via chain or belt by a friction wheel. The rotating brush is driven, via a chain or belt, by a drive wheel. The drive wheel is in friction contact with the wheelchair tire. The brush and drive wheel are mounted on a block shrouded by a splash board. The assembly is linked by a system of rods to a clamp. The assembly can be hinged onto the tire using a short handle. This disclosure shows a brush that is powered using a drive wheel that comes in contact with a wheelchair tire. As the wheelchair is already manually powered, adding the transmission mechanism of a brush only adds complication and weight to the brush and the required effort of the user of such machine. Additionally, the means by which the brush is mounted and adjusted is limited to a specific type of wheelchair as there lacked provisions for accommodating wheelchair frames of various types and makes.

Thus, there arises a need for a wheelchair tire cleaner which can be adapted to existing wheelchairs of varying and diverse designs.

SUMMARY OF THE INVENTION

The present invention is directed toward an apparatus for cleaning a wheelchair tire of a wheelchair in use. The apparatus is configured for attachment to a portion of the wheelchair. The apparatus comprises:
(a) a main cylinder head having a joint at a first end and a cavity at a second end and a main cylinder rod having a first end configured to be rotatably and slidably adjusted within the cavity and a joint at a second end of the cylinder rod;
(b) a cleaner head comprising a U-shaped member having a base portion, two leg portions, a joint disposed on an attachment portion of the U-shaped member and a plurality of cleaning surfaces, wherein each cleaning surface is disposed on an inwardly facing surface of the U-shaped member, each leg portion extending perpendicularly from the base portion and the length of the base portion is adjustable;
(c) an adapter having an clamp configured for attachment to the portion of the wheelchair at a first end and a joint at a second end, wherein the joint of the adapter is adjustably coupled with the joint of the cylinder head; and
(d) an elongated bracket having a joint at a first end and a joint at a second end,
wherein the joint at the first end of the elongated bracket is rotatably coupled to the joint at the second end of the cylinder rod and the joint at the second end of the elongated bracket is rotatably coupled to the joint disposed on the attachment portion of the U-shaped member.

Accordingly, it is a primary object of the present invention to provide a wheelchair tire cleaner which can be adapted to existing wheelchairs of varying and diverse designs.

It is another object of the present invention to provide a wheelchair tire cleaner having a cleaner head that can be adapted to clean tires of different widths.

It is yet another object of the present invention to provide a wheelchair tire cleaner that is sufficiently rigid while in use.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a simplified diagram depicting the orientation in which a present cleaning apparatus is attached to a wheelchair.

FIG. 2 is a top view of the right wheel of a wheelchair, depicting a present cleaning apparatus that is adapted to the wheelchair at its axle without an obstacle between the apparatus and the wheel which the apparatus is adapted to clean.

FIGS. 7-9 are simplified drawings of the present apparatus, depicting examples where the importance of the present apparatus is emphasized.

PARTS LIST

Figure 3:
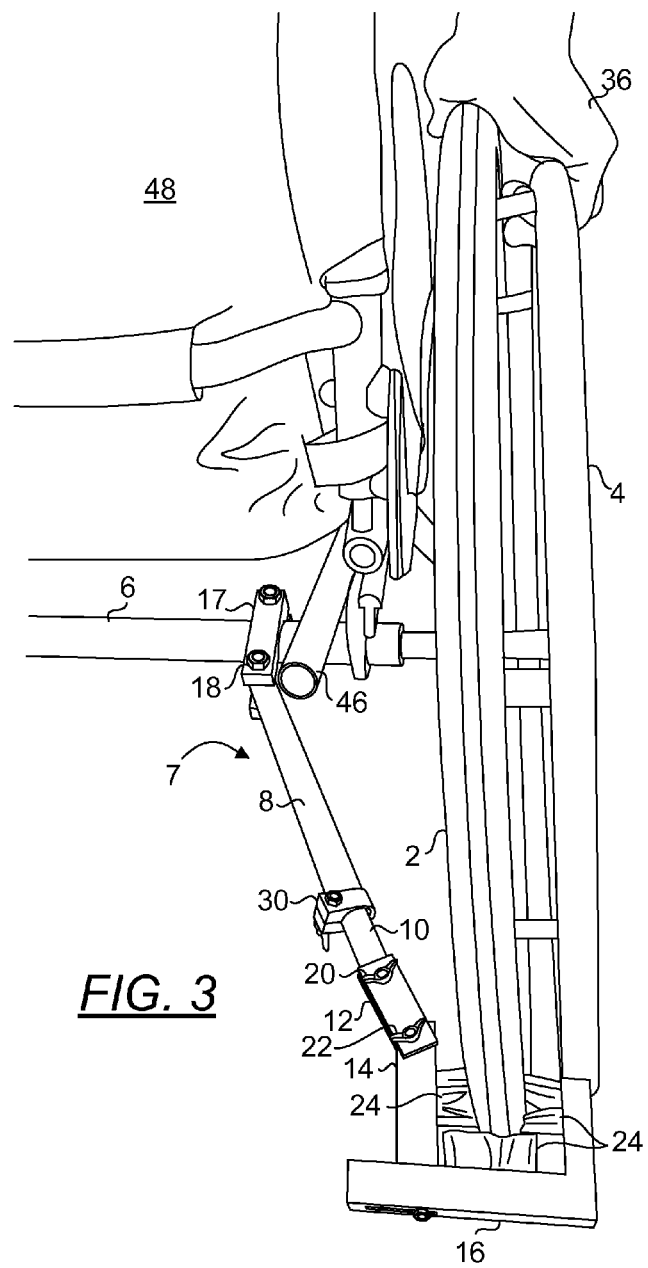
FIG. 3 is a top rear partial perspective view of the right wheel of a wheelchair, depicting a present cleaning apparatus that is adapted to a wheelchair at its axle with an obstacle between the apparatus and the wheel which the apparatus is adapted to clean.

2—wheelchair tire/wheel
4—hand rim
6—wheelchair axle
7—cleaning apparatus
8—main cylinder head
10—main cylinder rod
12—elongated bracket
13—cleaner head
14—cleaner housing
16—complementary cleaner housing
17—adapter
18—pivot enabling rotation between adapter and main cylinder head
20—pivot enabling rotation between main cylinder rod and elongated bracket
22—pivot enabling rotation between elongated bracket and cleaner housing
24—patch of cleaner bristles
26—wheelchair
28—direction in which wheelchair wheel rotates
30—lock
32—width between bristles
34—floor
36—hand of a wheelchair user
38—support bar
40—direction in which main cylinder head is rotated about pivot at adapter
42—direction in which main cylinder rod is extended from main cylinder head
44—direction in which elongated bracket is rotated about pivot at main cylinder rod
46—support structure of wheelchair seat
48—wheelchair seat
50—footrest
52—wheelchair frame
54—caster wheel
56, 58—obstacle
60—cleaner bristles
62—ferrule
64—aperture
66—tongue
68—groove
70—slot
72—retainer
74—groove
76—direction in which to insert ferrule of patch of cleaner bristles
78—toothed clamping surface
80—jaw
82—spacer
84—lock washer
86—slit
88—offset
90—anti-tip arm
92—anti-tip wheel 94—plane in which main cylinder head rotates
96—central plane of adapter

PARTICULAR ADVANTAGES OF THE INVENTION

The present apparatus is capable of being mounted in a manner to clean tire surfaces which have freshly contacted a floor surface. The present apparatus is capable to be adapted to wheelchairs of any type including fixed structure wheelchairs and foldable wheelchairs. The present apparatus can be used on wheels that are disposed at zero camber angle or wheels that are mounted at a positive or negative camber angle. The present cleaner head is capable of being adapted to clean tires of different widths. The present apparatus is rigid and capable of maintaining a substantially fixed position in relation to the wheel which it is configured to clean.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower). FIG. 1 is a simplified diagram depicting the orientation in which a present cleaning apparatus is attached to a wheelchair. As the wheelchair 26 moves forward, the tire 2 rotates in direction 28. The apparatus 7 is mounted on an axle 6 such that its cleaner head comes in contact with a portion of the tire 2 just downstream from its contact surfaces with the floor. As such, when a wheel/tire is rotated, its soiled surfaces are expediently cleaned after contacting a floor surface. As will be disclosed elsewhere herein, the apparatus may also be adapted to a wheelchair without an axle.

A conventional wheelchair 26 includes a frame, front caster assemblies pivotally mounted to the frame, rear wheel assemblies rotatably mounted to the frame, and a seat assembly and footrests 50 that are fixedly mounted to the frame 52. The front caster assemblies and rear wheel assemblies support the frame 12 upon a floor 34. A rear wheel assembly includes a wheel 2 and a hand rim 4 serving as a grasping surface for propelling the wheelchair. A front caster assembly includes a caster wheel 54 pivotally mounted to the frame 52 such that directional changes to the wheelchair can be facilitated. The frame 52 can include an axle 6 as shown in FIG. 1, i.e., a crossbar connecting the two wheels 2. As disclosed elsewhere herein, the frame of a wheelchair can also include one which does not include an axle 6.

FIG. 2 is a top view of the right wheel of a wheelchair, depicting a present cleaning apparatus 7 that is adapted to a wheelchair at its axle 6 without an obstacle and the wheel which the apparatus is adapted to clean. An example of such obstacle is a support structure. Only a portion of an axle 6 and one tire 2 are depicted. As shown, there is sufficient clearance for the cleaning apparatus 7 to be mounted on the axle 6 as closely as possible to the tire 2. Further, the tire 2 is mounted substantially perpendicularly to the axle 6.

Figure 4:
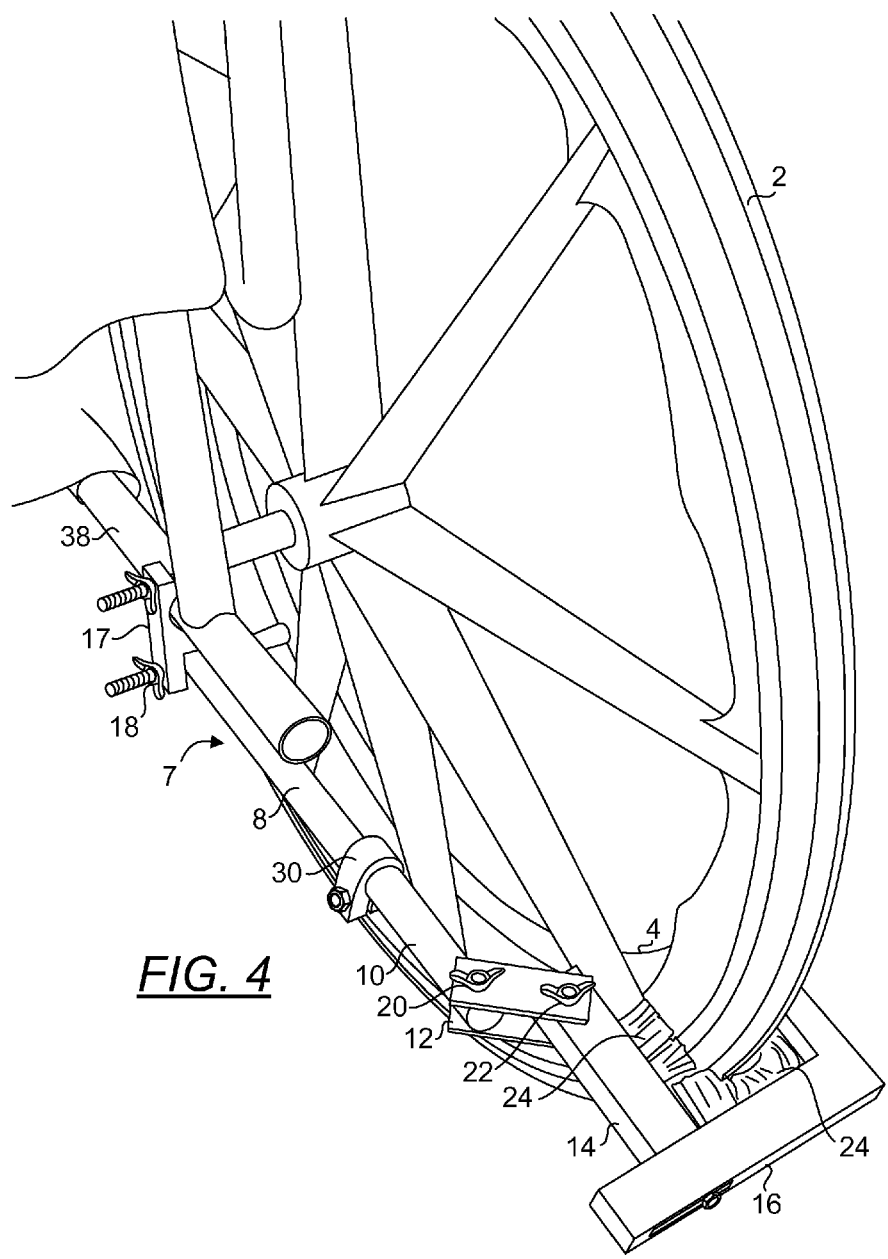
FIG. 4 is a top rear partial perspective view of the right wheel of a wheelchair, depicting a present cleaning apparatus that is adapted to a wheelchair without an axle.

The cleaning apparatus 7 is essentially an adjustable bar having an adapter 17 on one end and a cleaner head 13 on the opposing end. The adapter 17 is configured to be removably secured to a part of a wheelchair. The adjustable bar includes a main cylinder head 8 pivotably attached at pivot 18 to the adapter 17, the main cylinder head 8 having an opening configured to receive a main cylinder rod 10 slideable within the main cylinder head's opening and can be locked in place using a lock 30 to form a suitable length. The free end of the main cylinder rod 10 is pivotably connected to an elongated bracket 12 at pivot 20. In one embodiment, the elongated bracket 12 is constructed from a pair of braces as shown in FIG. 4. The cleaner head 13 is in turn connected to the bracket 10 at pivot 22.

The cleaner head 13 includes a cleaner housing 14 configured to slidingly cooperate with a complementary cleaner housing 16 such that the width 32 of the cleaner head can be adjusted to accommodate various tire widths. It shall be noted that, in addition to the sliding action of the main cylinder rod 10 in the main cylinder head's opening, the main cylinder rod may also rotate about the central axis of the opening. In one embodiment, the cleaner head includes a plurality of patches 24 of cleaner bristles. In one embodiment, such patches are removably attached to the cleaner head. In another embodiment, the entire cleaner head is replaceable. Alternatively, foam pads may also be used instead of patches of bristles.

It shall be noted that, without any obstacles along the axle 6 between the apparatus 7 and the wheel 2, the bracket 12, main cylinder head 8, main cylinder rod 10, adapter 17 could have been replaced with a rigid rectilinear linear rod without compromising the functionality of the apparatus. However, such is not the case with possible wheelchair configurations shown in FIGS. 3-6 where a rigid rectilinear rod would not have worked. In one embodiment, the width 32 between bristles is adjustable from about ¾ inches to about 2 inches.

Pivots 18 and 20 are preferably two dimensional joints (as compared to ball-socket joints) as such joints limit the degree of freedom available at these joints and therefore minimizing the possibility of such joints from inadvertently losing their locked position due to vibration and impact, etc. A two dimensional joint is a joint where two components connected via such joint rotate with respect one another in a plane.

FIG. 3 is a top rear partial perspective view of the right wheel of a wheelchair, depicting a present cleaning apparatus that is adapted to a wheelchair at its axle 6 with an obstruction 46 between the apparatus and the wheel the apparatus is adapted to clean. A support structure 46 is disposed in the vicinity to each of the wheels of the wheelchair, presenting a barrier for mounting a cleaner supported simply by a rectilinear structure. It shall be noted that the main cylinder head is rotated about pivot 18 of adapter 17 and the cleaner housing 14 is rotated about pivot 22 of bracket 12 in order to achieve a configuration depicted in FIG. 3. In addition, FIG. 3 depicts a common practice among wheelchair users. Wheelchair users, especially those who have depended on wheelchairs extensively, tend to propel their wheelchairs by not only grasping the hand rim 4 but also the tires 2 directly, perhaps for increased grip surface area. Therefore, despite the availability of hand rims 4 as grasping locations for hands, a wheelchair user's hands typically come in contact with both hand rims and tires directly. As such, it is imperative to keep the tires free from debris as much as possible.

FIG. 4 is a top rear partial perspective view of the right wheel of a wheelchair, depicting a present cleaning apparatus that is adapted to a wheelchair without an axle. The frame of this wheelchair includes a support bar 38 disposed in a direction substantially parallel to the direction of travel for the wheelchair. Such a wheelchair is typically of the folding type as the lack of an axle enables the wheelchair to be collapsed into a scissors-type frame.

Figure 5:
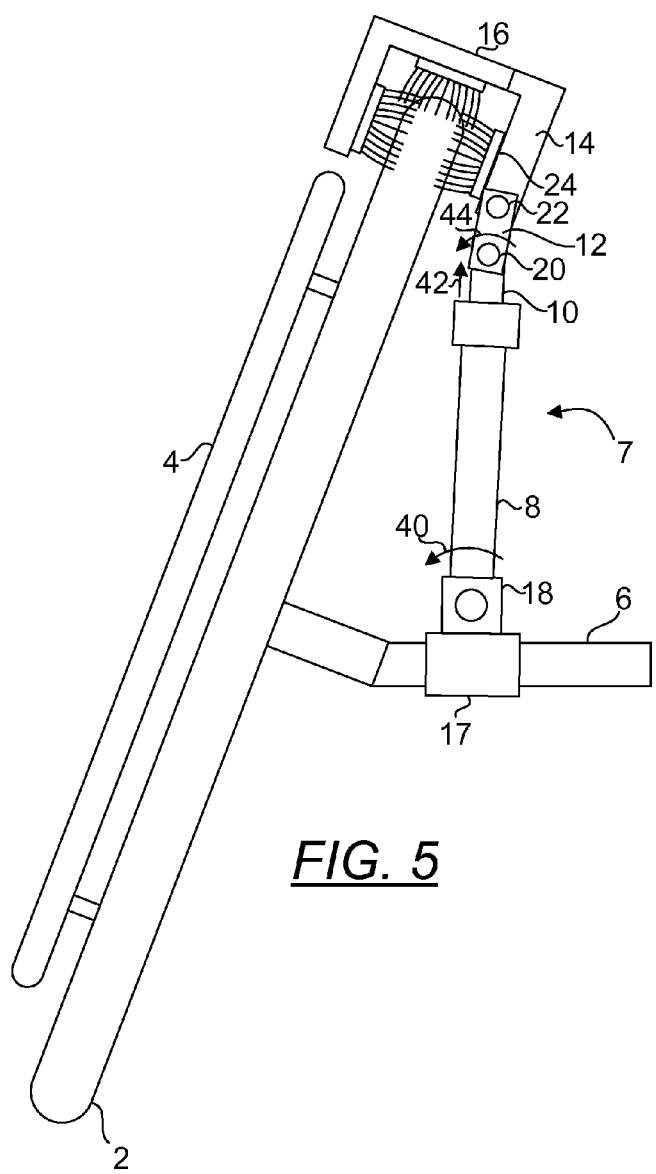
FIG. 5 is a front orthogonal view of the right wheel of a wheelchair, depicting a present cleaning apparatus that is adapted to the wheelchair at its axle where the wheel is disposed at a camber angle (or non-perpendicularly) to the axle and the cleaner head is disposed at a location that is over the top of the wheel.
Figure 6:
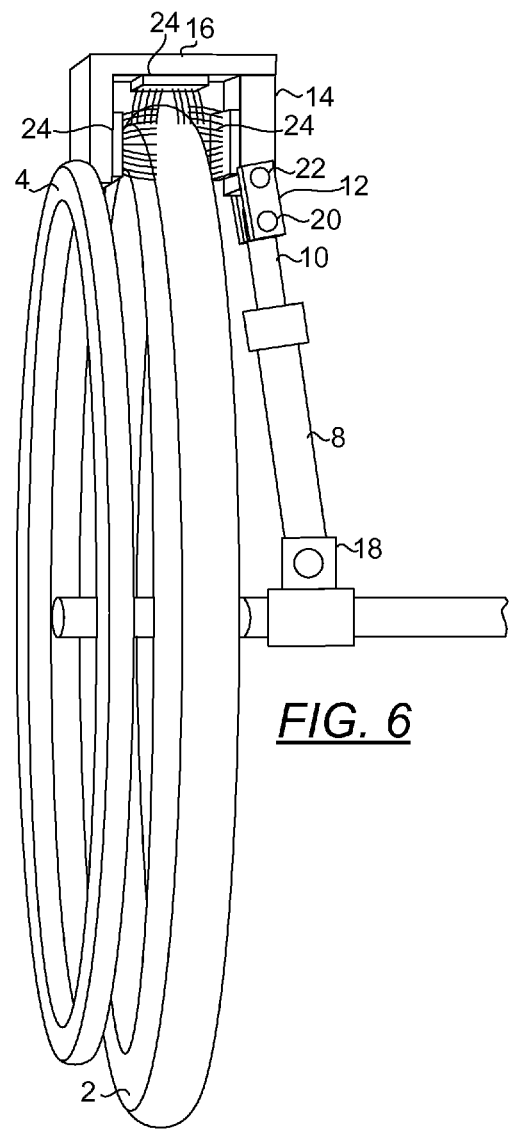
FIG. 6 a top orthogonal view of the right wheel of a wheelchair, depicting a present cleaning apparatus that is adapted to a wheelchair at its axle, at a location farther removed from the wheel than it is in the case of FIG. 4 and the cleaner head is disposed at a trailing location of the axle.

FIG. 5 a front orthogonal view of a right wheel of a wheelchair, depicting a present cleaning apparatus that is adapted to the wheelchair at its axle 6 where the wheel is disposed at a camber angle (or non-perpendicularly) to the axle 6 and the cleaner head is disposed at a location that is over the top of the wheel. FIG. 6 is a top orthogonal view of the right wheel of a wheelchair, depicting a present cleaning apparatus that is adapted to a wheelchair at its axle, at a location farther removed from a wheel than it is in the case of FIG. 5 and the cleaner head is disposed at a trailing location of the axle. Compared to the adapter 17 in FIG. 2, the adapter 17 of FIG. 5 is disposed at a greater distance from the hub of tire 2. If there is sufficient clearance between the adapter mounting location and the hub of the tire, the adapter 17 may alternatively be mounted closer to the hub. It shall be apparent, after viewing FIGS. 3-6 that, the present apparatus includes sufficient degrees of freedom, enabling it to be adapted to a wide range of wheel-axle configurations. For instance, if the mounting configuration of the present cleaning device as shown in FIG. 6 were to be achieved by changing the mounting configuration of FIG. 5, only slight adjustments of several joints would need to be made. For instance, the main cylinder head 8 would be rotated in direction 40, the bracket would be rotated in direction 44, the main cylinder rod 10 would be extended in direction 42 and the adapter 17 would be rotated about the axle 6. In contrast to the prior art wheelchair cleaners, the present apparatus is adaptable to all types and makes of wheelchairs, making it universally adaptable to all wheelchairs.

Figure 7:
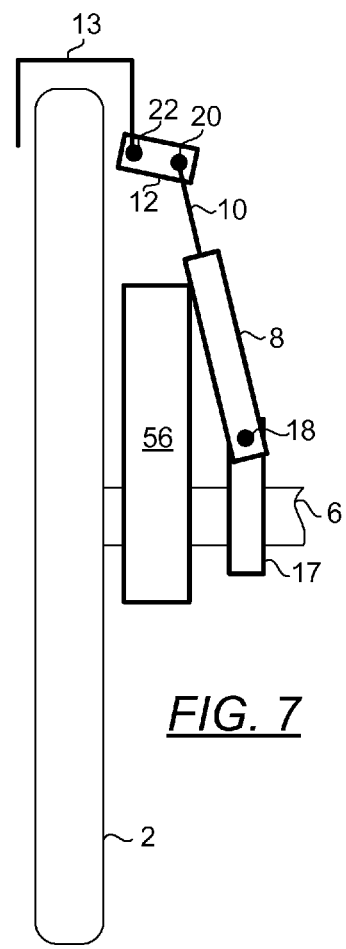

FIGS. 7-9 are simplified drawings of the present apparatus, depicting examples where the importance of the present apparatus is emphasized. FIG. 7 depicts a present apparatus being used in an environment in which an obstacle 56 exists between the wheel 2 and the apparatus along an axle 6. Even with the presence of obstacle 56, the present apparatus can be adjusted to an appropriate cleaning position as demonstrated in FIG. 7.

An argument may be made that not all components are critical to the adjustability of the present apparatus as depicted in FIG. 8. FIG. 8 depicts an apparatus where the elongated bracket 12 had been removed for simplicity. It shall be noted that, in order to make the simplified apparatus work, the simplified apparatus must now be shifted along the axle 6 away from the wheel 2. Although not elegant, such simplified apparatus may suit the wheelchair configuration of FIGS. 7 and 8. However, if another obstacle 58 exists such that the freedom to mount the adapter 17 along the axle 6 is constrained, the simplified apparatus would no longer work as there would be a gap 60 between the main cylinder rod 10 and the cleaner head 13.

Various types of fastening devices may be used to secure each joint. In one embodiment as shown in FIGS. 3 and 4, screws and wing nuts are used to secure adapter 17 (including pivot 18), pivots 20, 22 and lock 30 as wing nuts provide sufficient grasps for human fingers. For each wheelchair, a pair of the present apparatuses need only be set up once with one for each tire. Once installed, a present apparatus may be removed if such apparatus presents a barrier while the wheelchair is in use, e.g., when the wheelchair has to be lifted to clear obstacles in non-wheelchair friendly environments, such as steps and uneven grounds.

Figure 10:
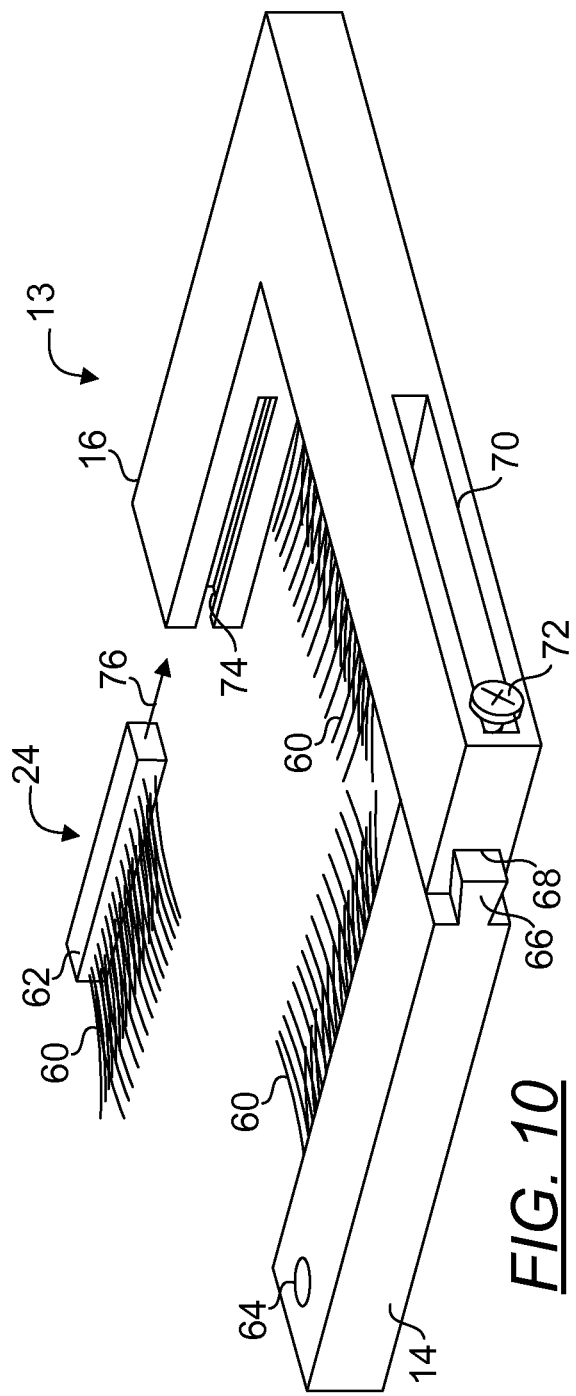
FIG. 10 is a perspective view, depicting one embodiment of the present cleaner head.

FIG. 10 is a perspective view depicting one embodiment of the cleaner head 13. A tongue 66 is disposed on one end of the cleaner housing 14. A matching groove 68 is disposed on one end of the complementary cleaner housing 16. A slot 70 is disposed on this same end of the complementary cleaner housing 16 such that when the tongue 66 is installed in the groove 68 while in use, a retainer 72, e.g., screw, can be secured onto the tongued end of the cleaner housing 14 to prevent detachment of the complementary cleaner housing 16 from the cleaner housing 14 while enabling the housing 14 and the complementary housing 16 to slide with respect to one another. In order to adjust the width of the cleaner head 13, the complementary cleaner housing 16 is slid along the groove 68 relative to the tongue 66 of the cleaner housing 14. Each patch 24 of cleaning bristles includes a ferrule 62 to which cleaner bristles are attached. In one embodiment, during installation, a patch 24 is aligned such that its ferrule 62 is aligned with a groove 74 disposed on each end of the complementary cleaner housing 16 and cleaner housing 14 and inserted, e.g., in direction 76, into such groove 74. In a preferred embodiment, a ferrule 62 is simply secured by friction in such groove 74. In another embodiment, a retaining cap is disposed on the opening of a groove 74 to prevent the dislodgement of a ferrule 62 from the groove 74. Also shown is an aperture 64 through which the hardware that enables pivot 22 is disposed. In another embodiment, the cleaner head 13 itself is replaced when the bristles become worn out.

Figure 11:
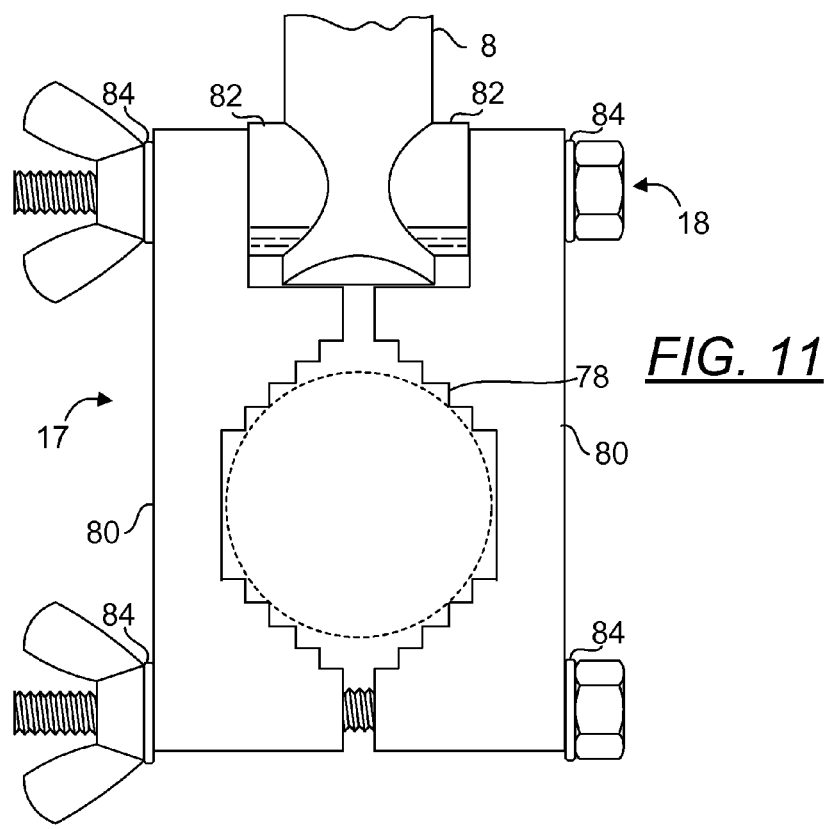
FIG. 11 is a partial orthogonal view depicting one embodiment of the present adapter.
Figure 12:
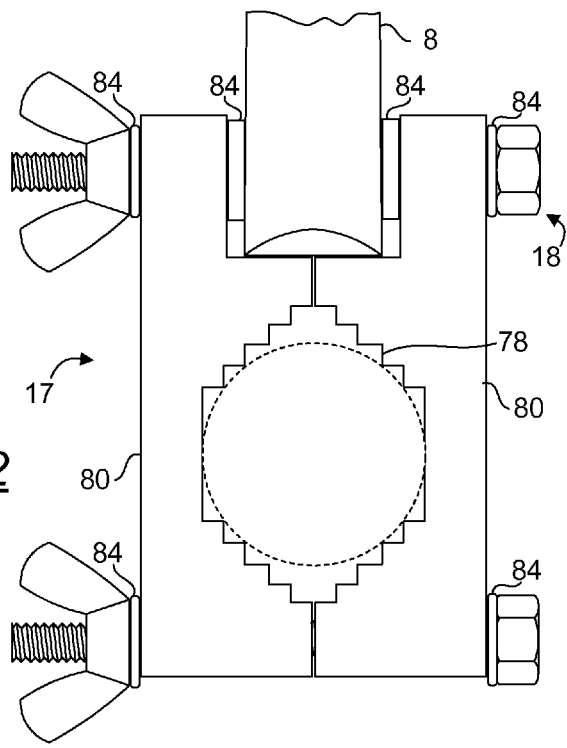
FIG. 12 is a partial orthogonal view depicting another embodiment of the present adapter.

FIG. 11 is a partial orthogonal view depicting one embodiment of the adapter 17. The present adapter 17 is essentially a pair of jaws 80 having toothed clamping surfaces 78 on a first end and a pivot 18 on a second end. The pair of jaws 80 is configured to be secured to an existing tubular part of a wheelchair, e.g., previously disclosed axle or support bar of a wheelchair. A pair of spacers 82 may alternatively be used to adjust the diameter of the opening defined by the jaws 80. In another embodiment shown in FIG. 12, a pair of lock washers 84 may be used to reduce the size of the opening defined by the jaws 80. It shall be noted that the jaws are brought closer together in FIG. 12 than they are in FIG. 11. In a preferred embodiment, lock washers 84 are also used to secure screws and wing nuts to the jaws 80.

Figure 13:
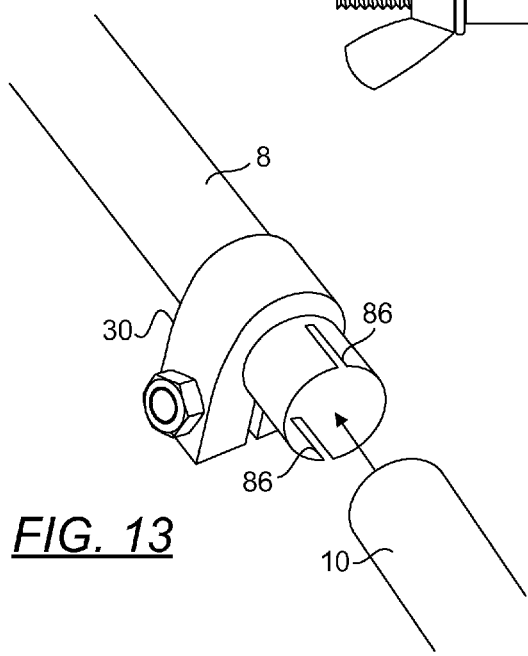
FIG. 13 is a partial close-up view of the end of the main cylinder head having an opening, depicting an interface at which the main cylinder rod is removably secured to the main cylinder head.

FIG. 13 is a partial close-up view of the end of the main cylinder head having an opening, depicting an interface at which the main cylinder rod is removably secured to the main cylinder head. In order to allow size adjustment of the opening of the main cylinder head 8, at least one slit 86 is disposed on this end. In one embodiment, two slits 86 are used. In another embodiment, four slits 86 are used. In securing the main cylinder rod 10, the same end is first slid into the opening and adjusted to a preferred orientation before the lock 30 is slid over the opening end of the main cylinder head having the slits 86. The lock 30 is then tightened to clamp such opening against the rod 10 to prevent any relative movements between the head 8 and the rod 10.

Figure 14:
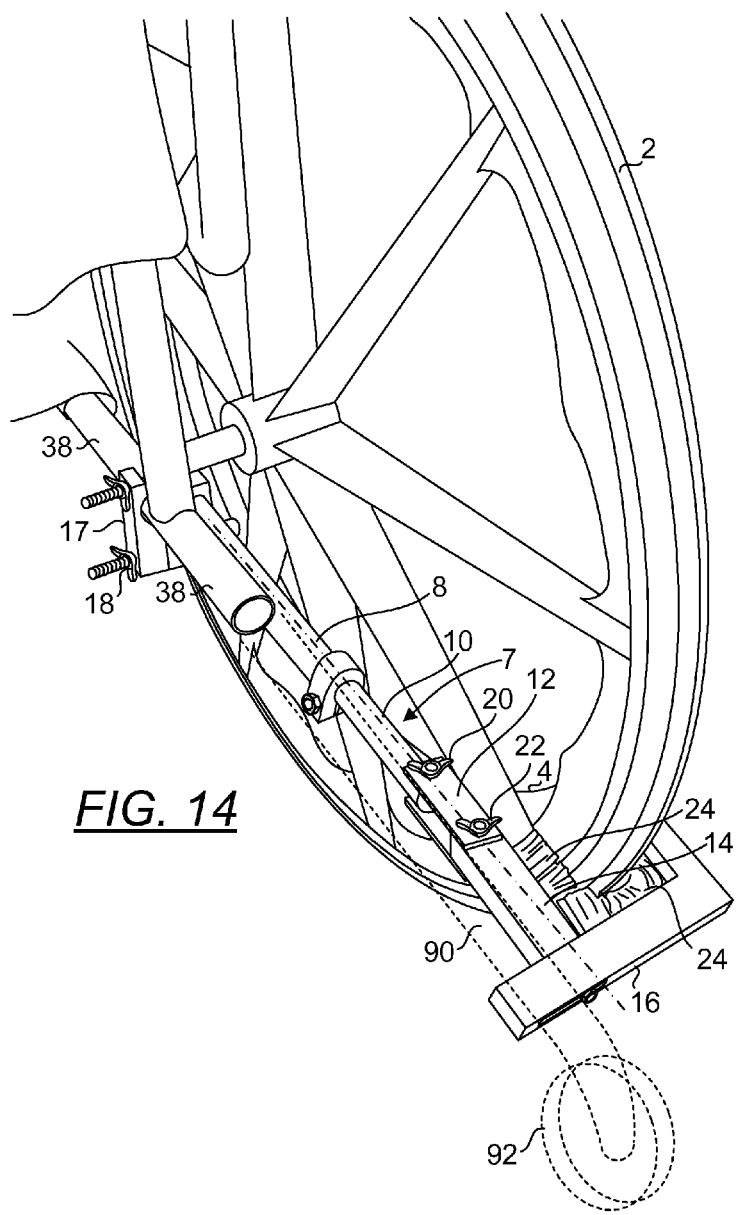
FIG. 14 is a view depicting another embodiment of the present cleaning apparatus being used on a collapsible wheelchair (one without an axle).
Figure 15:
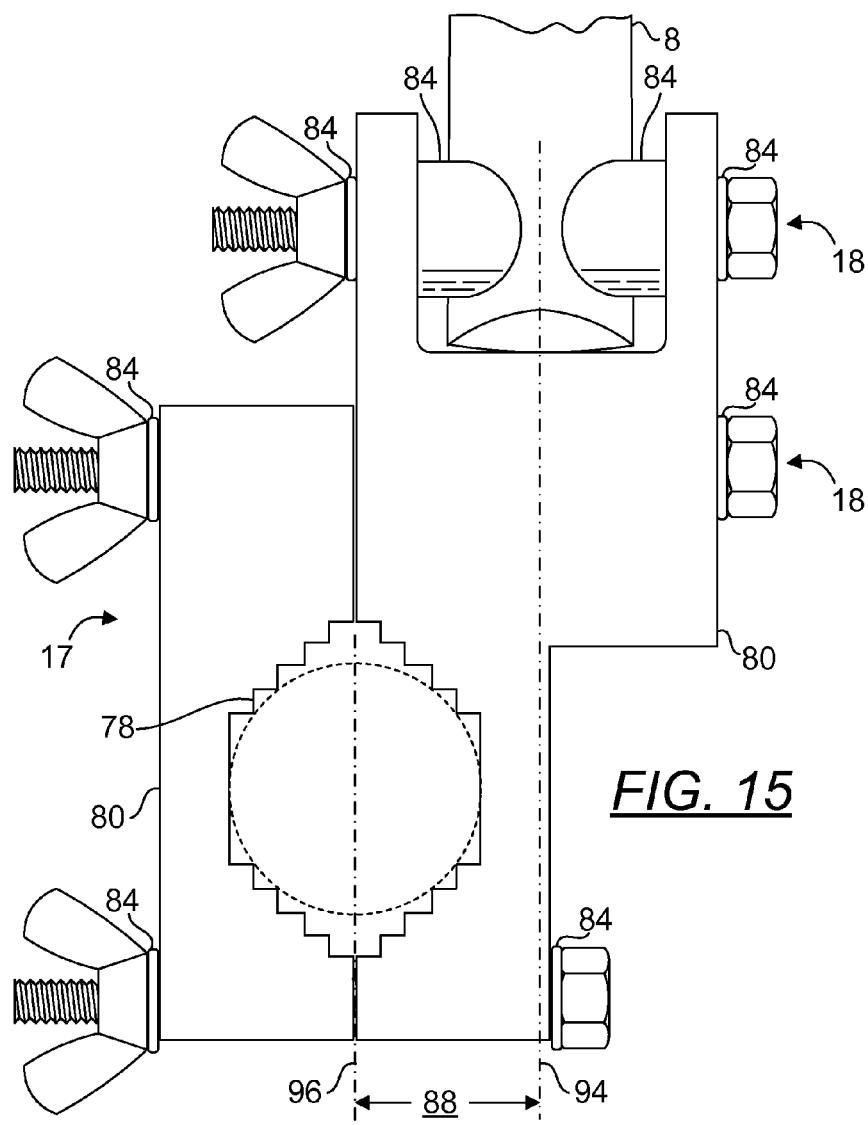
FIG. 15 is a partial close-up view depicting another embodiment of the present adapter.

FIG. 14 is a view depicting another embodiment of the present cleaning apparatus being used on a collapsible wheelchair (one without an axle). FIG. 15 is a partial close-up view depicting another embodiment of the present adapter. It shall be noted that, in this embodiment, the adapter 17 is configured such that the plane 94 in which the head 8 rotates and the central plane 96 of the adapter 17 are not coplanar but disposed at an offset 88 from one another. This configuration of the adapter is especially useful when the present apparatus needs to co-exist with an anti-tip device such as one disclosed in FIG. 14. As shown in FIG. 14, the anti-tip device includes an anti-tip arm 90 extending from support bar 38 and terminating with an anti-tip wheel 92 that is mounted at the end of the anti-tip arm 90. By having an offset 88, the adapter 17 is capable of being mounted without interfering with the anti-tip device. In addition, the Applicant discovered that by providing an offset 88, the apparatus 7 can be disposed in a configuration that is rather straight as shown in FIG. 14, thereby reducing the need for adjusting the angles certain components (e.g., the elongated bracket 12, the main cylinder head 8, etc.) make relative to their adjacent component/s in order to achieve the degree of freedom required to mount the cleaning apparatus 7. In one embodiment, the offset 88 measures from about 0.5 inch to about 3 inches.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

I claim:

1. An apparatus for cleaning a wheelchair tire of a wheelchair in use, said apparatus is configured for attachment to a portion of the wheelchair, said apparatus consisting of:
   (a) a main cylinder head having a joint at a first end and a cavity at a second end and a main cylinder rod having a first end configured to be rotatably and slidably adjusted within said cavity and a joint at a second end;
   (b) a cleaner head comprising a joint disposed on an attachment portion of said cleaner head;
   (c) an adapter having a toothed clamp configured for attachment to the portion of the wheelchair at a first end and a joint at a second end, wherein said joint of said adapter is adjustably coupled with said joint of said cylinder head; and
   (d) an elongated bracket having a joint at a first end and a joint at a second end, wherein said joint at said first end of said elongated bracket is rotatably coupled to said joint at said second end of said cylinder rod and said joint at said second end of said elongated bracket is rotatably coupled to said joint disposed on said attachment portion of said cleaner head.

2. The apparatus of claim 1, wherein said cleaner head comprises a U-shaped member having a base portion, two leg portions, and a plurality of cleaning surfaces, wherein each cleaning surface is disposed on an inwardly facing surface of said U-shaped member, each leg portion extending perpendicularly from said base portion and the length of said base portion is adjustable.

3. The apparatus of claim 1, said elongated bracket comprises a pair of braces.

4. The apparatus of claim 1, wherein each of said plurality of cleaning surfaces is constructed from a material selected from the group consisting of bristles and foam pads.

5. The apparatus of claim 1, wherein said joint of said cylinder head comprises a two-dimensional joint.

6. The apparatus of claim 1, wherein said joint of said cylinder rod comprises a two-dimensional joint.

7. The apparatus of claim 1, wherein said clamp further comprises a central plane and said joint of said adapter is disposed at an offset from said central plane.

8. The apparatus of claim 7, wherein said offset ranges from about 0.5 inch to about 3 inches.

9. An apparatus for cleaning a wheelchair tire of a wheelchair in use, said apparatus is configured for attachment to a portion of the wheelchair, said apparatus consisting of:
   (a) a main cylinder head having a joint at a first end and a cavity at a second end and a main cylinder rod having a first end configured to be rotatably and slidably adjusted within said cavity and a joint at a second end of said main cylinder rod;
   (b) a cleaner head comprising a U-shaped member having a base portion, two leg portions, a joint disposed on an attachment portion of said U-shaped member and a plurality of cleaning surfaces, wherein each cleaning surface is disposed on an inwardly facing surface of said U-shaped member, each leg portion extending perpendicularly from said base portion and the length of said base portion is adjustable;
   (c) an adapter having a toothed clamp configured for attachment to the portion of the wheelchair at a first end and a joint at a second end, wherein said joint of said adapter is adjustably coupled with said joint of said cylinder head; and
   (d) an elongated bracket having a joint at a first end and a joint at a second end,
   wherein said joint at said first end of said elongated bracket is rotatably coupled to said joint at said second end of said cylinder rod and said joint at said second end of said elongated bracket is rotatably coupled to said joint disposed on said attachment portion of said U-shaped member.

10. The apparatus of claim 9, said elongated bracket comprises a pair of braces.

11. The apparatus of claim 9, wherein each of said plurality of cleaning surfaces is constructed from a material selected from the group consisting of bristles and foam pads.

12. The apparatus of claim 9, wherein said joint of said cylinder head comprises a two-dimensional joint.

13. The apparatus of claim 9, wherein said joint of said cylinder rod comprises a two-dimensional joint.

14. The apparatus of claim 9, wherein said clamp further comprises a central plane and said joint of said adapter is disposed at an offset from said central plane.

15. The apparatus of claim 14, wherein said offset ranges from about 0.5 inch to about 3 inches.

* * * * *